United States Patent [19]

Aoki et al.

[11] Patent Number: 4,926,271

[45] Date of Patent: May 15, 1990

[54] RECORDING REPRODUCING CONTROL CIRCUIT FOR RECORDING APPARATUS

[75] Inventors: Hidehiko Aoki; Yoshihiko Kanbara, both of Kanagawa, Japan

[73] Assignee: Kabushiki Kaisha Toshiba, Kawasaki, Japan

[21] Appl. No.: 224,954

[22] Filed: Jul. 27, 1988

[30] Foreign Application Priority Data

Jul. 29, 1987 [JP] Japan .................................. 62-189401

[51] Int. Cl.⁵ .............................................. G11B 15/12
[52] U.S. Cl. ........................................................ 360/62
[58] Field of Search .............................. 360/62, 67, 68

[56] References Cited

U.S. PATENT DOCUMENTS 4,665,446 5/1987 Takayama .............................. 360/62

*Primary Examiner*—Vincent P. Canney

*Attorney, Agent, or Firm*—Finnegan, Henderson, Farabow, Garrett and Dunner

[57] ABSTRACT

A control circuit for a recording and reproducing apparatus. The circuit includes a single magnetic head for recording and reproducing signals corresponding to data on a recording medium, a recording circuit for supplying a recording signal to be recorded to the magnetic head, a reproducing circuit for amplifying a reproduced signal detected from the recording medium by the magnetic head; and a switch for selectively shifting the apparatus between a recording phase wherein the recording circuit is activated, and a reproducing phase wherein the reproducing circuit is activated, wherein the reproducing circuit includes capacitors for storing an electric charge during operation of the apparatus, and buffers for maintaining the charge stored by the capacitors at a substantially constant level when the switch shifts between the recording phase and the reproducing phase.

5 Claims, 4 Drawing Sheets

RECORDING REPRODUCING CONTROL CIRCUIT FOR RECORDING APPARATUS

FIELD OF THE INVENTION

The present invention relates generally to a control circuit for a recording and reproducing apparatus, and more particularly to a control circuit for a recording and reproducing apparatus with a high density recording.

BACKGROUND OF THE INVENTION

Recently, high density recording apparatus, such as digital audio tape recorders, video tape recorders or the like, have been developed. In these high density recording apparatus, e.g., the digital audio tape recorders, there are tape recorders having an after-recording function. The after-recording function is a function used for recording some information on a specified recording area other than a pre-recorded area of a recording tape. Typically, the specified recording area for the after-recording and the pre-recorded area are closely aligned to each other on the same record track. In the digital audio tape recorders, for instance, informatiOn data for the after-recording is recorded on a specific block in a sub-code area aligned at the ends of every record track, as provided in the EIAJ Standards. On the other hand, other data, i.e., main data such as music is recorded on a main data block area aligned at the center of every record track.

A typical operation of the after-recording is carried out with a detection of the pre-recorded zone. Accordingly, reproducing and recording operations are alternatelY carried out during after-recording.

In conventional high density recording apparatus, e.g., digital audio tape recorders, both the reproducing operation and the recording operation have been carried out using a common magnetic head. The reproducing operation and the recording operation in the after-recording operation also are carried out using a common magnetic head. Thus, the operation of the common magnetic head frequently changes between the reproducing phase and the recording phase at a rapid speed.

In the reproducing phase, a reproduced signal S2 obtained from the magnetic head is applied to a reproduced signal amplifier and amplified therein. In the recording phase, recording signals obtained from a recording signal amplifier to the magnetic head. The recording signal amplifier and the reproduced signal amplifier are selectively turned ON or OFF in response to the reproducing phase or the recording phase.

Referring now to FIG. 1, an example of a conventional control circuit for a recording and reproducing operation of digital audio tape recorders will be briefly described. FIG. 1 is a circuit diagram showing the conventional control circuit for a recording and reproducing operation.

In FIG. 1, numeral 10 designates a supply source of a recording signal S1. A recording signal amplifier 11 is provided with an input terminal 11a for receiving the recording signal S1. An output terminal 11b of the recording signal amplifier 11 is coupled to a rotary head device 12. The rotary head device 12 comprises a magnetic head 13 and a rotary transformer 14 coupled between the recording signal amplifier 11 and the magnetic head 13. A bias terminal 11c of the recording signal amplifier 11 is coupled to a power source 15 with a voltage Vcc through a first switch 16. Further, a ground terminal 11d of the recording signal amplifier 11 is coupled to a ground potential source 17.

The first switch 16 comprises a common terminal 16a coupled to the power source 15, a first switch terminal 16b left uncoupled and a second switch terminal 16c coupled to the bias terminal 11c of the recording signal amplifier 11. The common terminal 16a is selectively connected to the first switch terminal 16b or the second switch terminal 16c in response to the reproducing phase or the recording phase. Thus, the bias voltage Vcc is applied to the bias terminal 11c in the recording phase so that& the recording signal amplifier I! is activated. On the other hand, the bias voltage Vcc is not applied to the bias terminal 11c in the reproducing phase so that the recording signal amplifier 11 is deactivated. Here, it is assumed that the output terminal 11b takes a high impedance state in the reproducing phase.

The rotary head device 12 is coupled not only to the output terminal 11b of the recording signal amplifier 11, but also to a first reproduced signal amplifier 18 through a coupling capacitor 19. The first reproduced signal amplifier 18 is constituted by a differential amplifier 20 comprising a pair of transistors 21 and 22. In the differential amplifier 20, the base of the transistor 21 is coupled to the rotary head device 12 through the coupling capacitor 19. The collector of the transistor 21 is coupled to the power source 15 through a load resistor 23 of the first reproduced signal amplifier 18. The emitters of the transistors 21 and 22 are coupled to each other. The base of the transistor 22 is coupled to a reference voltage source 24, as described later. The collector of the transistor 22 is couple to the power source 15 through another load resistor 25 of the first reproduced signal amplifier 18. The emitters of the transistors 21 and 22 are coupled to the ground potential source 17 through a series circuit of a second switch 26 and a current source 27 of the first reproduced signal amplifier 18. The current source 27 provides a bias current I.

The second switch 26 comprises a common terminal 26a coupled to the current source 27, a first switch terminal 26b coupled to the emitters of the transistors 21 and 22 and a second switch terminal 26c left uncoupled. The common terminal 26a is selectively connected to the first switch terminal 26b or the second switch terminal 26c in response to the reproducing phase or the recording phase. Thus, the bias current I is supplied to the emitters of the transistors 21 and 22 in the reproducing phase so that the differential amplifier 20 is activated. On the other hand, the bias current I is not supplied to the emitters of the transistors 21 and 22 in the recording phase so that the differential amplifier 20 is deactivated.

The reference voltage source 24 comprises a pair of resistors 28 and 29. The resistors 28 and 29 are coupled in series between the power source 15 and the ground potential source 17. A coupling node between the resistors 28 and 29 constitutes a reference voltage output terminal 24a of the reference voltage source 24 and is coupled to the base of the transistor 22 of the differential amplifier 20. A capacitor 30 is coupled between the base of the transistor 22 and the ground potential source 17, so that an alternating-current (abbreviated as AC hereafter) impedance on the base of the transistor 22 is decreased.

The collectors of the transistors 21 and 22 are coupled to first and second output terminals 18a and 18b of the first reproduced signal amplifier 18, respectively.

the first and second output terminals 18a and 18b are coupled to a second reproduced signal amplifier 31. The second reproduced signal amplifier 31 is provided with input terminals 31a and 31b coupled to the first and second output terminals 18a and 18b of the first reproduced signal amplifier 18, respectively, for receiving differential outputs of the first reproduced signal amplifier 18. An output terminal output terminal 31c of the second reproduced signal amplifier 31 is coupled to an output terminal 32 of the control circuit for the recording and reproducing apparatus. The output terminal 32 provides a reproduced signal obtained by the control circuit for the recording reproducing to a suitable circuit for processing the reproduced signal. A bias terminal 31d of the second reproduced signal amplifier 31 is coupled to the power source 15 through a third switch 33. Further, a ground terminal 31e of the second reproduced signal amplifier 31 is coupled to the ground potential source 17.

The third switch 33 comprises a common terminal 33a coupled to the power source 15, a first switch terminal 33b coupled to the bias terminal 31d of the second reproduced signal amplifier 31 and a second switch terminal 33c left uncoupled. The common terminal 33a is selectively connected to the first switch terminal 33b or the second switch terminal 33c in response to the reproducing phase or the recording phase. Thus, the bias voltage Vcc is applied to the bias terminal 31d in the reproducing phase, so that the second reproduced signal amplifier 31 is activated. On the other hand, the bias voltage Vcc is not applied to the bias terminal 31d in the recording phase, so that the second reproduced signal amplifier 31 is deactivated. Here, it is assumed that the output terminal 31c takes a high impedance state in the recording phase.

Further the output terminal 31c of the second reproduced signal amplifier 31 is coupled to the first reproduced signal amplifier 18 through a feedback circuit 34 for dumping an undesired resonant peak of the reproduced signal obtained on the output terminal 32 of the control circuit for the recording and reproducing. The feedback circuit 34 comprises a feedback amplifier 35, a pair of first and second feedback resistors 36, 37 and a feedback capacitor 38.

The feedback amplifier 35 is provided with an input terminal 35a coupled to the output terminal 31c of the second reproduced signal amplifier 31 for receiving the output of the second reproduced signal amplifier 31. An output terminal 35b of the feedback amplifier 35 is coupled to the first reproduced signal amplifier 18 through the first feedback resistor 36. In more detail, the output terminal 35b is coupled to the base of the transistor 21 of the differential amplifier 20 through the first feedback resistor 36. A bias terminal 35c of the feedback amplifier 35 is coupled to the power source 15 through a fourth switch 39. Further, a ground terminal 35d of the feedback amplifier 35 is coupled to the ground potential source 17.

The fourth switch 39 comprises a common terminal 39a coupled to the power source 15, a first switch terminal 39b coupled to the bias terminal 35c of the feedback amplifier 35 and a second switch terminal 39c left uncoupled. The common terminal 39a is selectively connected to the first switch terminal 39b or the second switch terminal 39c in response to the reproducing phase or the recording phase. Thus, the bias voltage Vcc is applied to the bias terminal 35c in the reproducing phase, so that the feedback amplifier 35 is activated.

On the other hand, the bias voltage Vcc is not applied to the bias terminal 35c in the recording phase, so that the feedback amplifier 35 is deactivated. Here, it is assumed that the ground terminal 35b takes a high impedance state in the recording phase.

The first feedback resistor 36 is coupled between the ground terminal 35b of the feedback amplifier 35 and the base of the transistor 21 of the differential amplifier 20, as described before. The second feedback resistor 37 and the feedback capacitor 38 are coupled in series between the ground terminal 35b of the feedback amplifier 35 and the ground potential source 17. As a result, the first reproduced signal amplifier 18, the second reproduced signal amplifier 31 and the feedback circuit 34 constitute an amplifier circuit for the reproduced signal S2.

Now the operation of the conventional recording reproducing control circuit for recording apparatus will be described The first, second, third and fourth switches 16, 26, 33 and 39 are simultaneously operated in response to the reproducing phase or the recording phase. In the after-recording operation mode, the reproducing phase and the recording phase changes therebetween at a rapid speed, as described before.

In the reproducing phase corresponding to the main data block area of every record track, the common terminals 16a, 26a, 33a and 39a of the first, second, third and fourth switches 16, 26, 33 and 39 are connected to the first switch terminals 16b, 26b, 33b and 39b, respectively. Thus, the first reproduced signal amplifier 18, the second reproduced signal amplifier 31 and the feedback amplifier 35 are activated. On the other hand, the recording signal amplifier 11 is deactivated, so that the recording signal amplifier 11 blocks the transmission of the recording signal S1 supplied from the recording signal source 10 to the rotary head device 12. Main data recorded on the main data block ar reproduced by the magnetic head 13 of the rotary head device 12. The reproduced signal S2 is applied to the first reproduced signal amplifier 18 through the coupling capacitor 19. Then, the reproduced signal S2 is amplified by the differential amplifier 20 and the second reproduced signal amplifier 31. Undesired resonant peak of the amplified data obtained from the output terminal 31c of the second reproduced signal amplifier 31 is suppressed by the feedback circuit 34. Thus, the reproduced signal S2 is obtained on the output termInal 32.

The feedback amplifier 35 in the feedback circuit 34 converts the voltage of the amplified data on the output terminal 31c of the second reproduced signal amplifier 31 to the corresponding current. The current output from the ground terminal 35b of the feedback amplifier 35 is again changed to a voltage data by the series circuit of the second feedback resistor 37 and the feedback capacitor 38. The voltage data are applied to the first reproduced signal amplifier 18, i.e., the base of the transistor 21 of the differential amplifier 20 through the first feedback resistor 36 as fedback data. That is, the fedback data have the opposite phase against the reproduced signal S2 from the rotary head device 12 to the first reproduced signal amplifier 18. The reproduced signal S2 from the rotary head device 12 is influenced bY the inductance of the rotary transformer 14 and the input capacitance of the transistor 21. Thus, the output data Of the first reproduced signal amplifier 18 include the undesired resonant peak, as described before, due to the resonance between the inductance of the rotary transformer 14 and the input capacitance of the transistor 21. The undesired resonant peak of the output data is suppressed by the feedback circuit 34. Further, the entire direct-current (abbreviated as DC hereafter) component of the output data on the output terminal 31c of the second reproduced signal amplifier 31 is negatively fedback through the feedback circuit 34 to the first reproduced signal amplifier 18. Thus, the output data on the output terminal S2 are stabilized.

In the recording phase corresponding to the sub-code area of every record track, the common terminals 16a, 26a, 33a and 39a of the first, second, third and fourth switches 16, 26, 33 and 39 are connected to the second switch terminals 16c, 26c, 33c and 39c, respectively. Thus, the first reproduced signal amplifier 18, the second reproduced signal amplifier 31 and the feedback amplifier 35 are deactivated. On the other hand, the recording signal amplifier 11 is activated, so that the recording signal amplifier 11 amplifies the recording signal S1 supplied from the recording signal source 10 and admits the transmission of the recording signal S1 to the rotary head device 12. Thus, the recording signal S1 is recorded on the specified block in the sub-code area of every record track for the after-recording.

The conventional recording reproducing control circuit for recording apparatus, however, has a drawback as described below.

In the after-recording operation, the operation of the circuit has to change between the reproducing phase and the recording phase at a very high speed. For example, the EIAJ standard for the digital audio tape recorders provides a buffer space corresponding to three data blocks between the sub-code area and the main data area. The buffer space corresponds to a time of about 115 μsec. in a tracing speed of the magnetic head for the tape. Accordingly, the operation of the circuit must change between the reproducing phase and the recording phase within 115 μsec. or at least at a maximum time period corresponding &o the passage of the buffer space over the magnetic head.

The capacitors 19, 30 and 38 in the conventional recording reproducing control circuit are charged or discharged at ever change between the reproducing phase and the recording phase. The chargings or the dischargings of the capacitors 19, 30 and 38 take a relatively long time, longer than 115 μsec. provided for the buffer space between the reproducing phase and the recording phase. Thus, the conventional recording reproducing control circuit is insufficient to carry out the after-recording operation accurately, since some data may be lost due to the delay.

Now the operations of the conventional control circuit for the recording and reproducing at the changes between the reproducing phase and the recording phase will be described.

First, the operation of the circuit at the change from the reproducing phase to the recording phase will be described. The base potential $Vb22a$ of the transistor 22 in the reproducing phase is given as follows;

$$Vb22a = [R29/(R28+R29)] \cdot Vcc - [I \cdot R28/2 \cdot (\beta+1)] \ldots \quad (1)$$

wherein R28 and R29 are the resistances of the resistors 28 and 29, and $\beta$ is the current amplification of the transistors 21 and 22.

In Equation (1), the first term of the right member represents the voltage on the coupling node 24a of the reference voltage source 24. The voltage on the coupling node 24a is a divided voltage of Vcc divided by the resistors 28 and 29. Now descriptions hereafter will be made by assuming the voltage Vb22a of Equation (1) as a reference voltage Vref. Then Equation (1) is changed as follows;

$$Vref = [R29/(R28+R29)] \cdot Vcc - [I \cdot R28/2 \cdot (\beta+1)] \ldots \quad (2)$$

When the operation of the circuit changes from the reproducing phase to the recording phase, the differential amplifier 20 is deactivated. Thus, the base current Ib22 is reduced to zero. The base potential $Vb22b$ of the transistor 22 in the recording phase is given as follows;

$$\begin{aligned} Vb22b &= [R29/(R28+R29)] \cdot Vcc \\ &= Vref + [I \cdot R28/2 \cdot (\beta+1)] \end{aligned} \quad (3)$$

The potential from $Vb22a$ to $Vb22b$ gradually changes, but not changes instantaneouslY. This is because a charge or a discharge of the capacitor 30 occurs at the potential change. The time spent in the potential change from $Vb22a$ to $Vb22b$ depends on the time constant $\tau a$ of the reference voltage source 24. The time constant $\tau a$ is given as follows;

$$\tau a = C30 \cdot [R28 \cdot R29/(R28+R29)] \ldots \quad (4)$$

Now the base potential $Vb21$ of the transistor 21 will be described. In the reproducing phase, the operations of the transistors 21 and 22 balance with each other. Thus, the base potential $Vb21a$ of the transistor 21 in the reproducing phase is the same the base potential $Vb22a$ of the transistor 22. The base potential $Vb21a$ of the transistor 21 is given as follows;

$$\begin{aligned} Vb21a &= [R29/(R28+R29)] \cdot Vcc - [I \cdot R28/2 \cdot (\beta+1)] \\ &= Vref \end{aligned} \quad (5)$$

When the operation phase of the circuit changes from the reproducing phase to the recording phase, the differential amplifier 20, the second reproduced signal amplifier 31 and the feedback amplifier 35 are deactivated. Thus, the differential amplifier 20, the second reproduced signal amplifier 31 and the feedback amplifier 35 provide a relatively high DC impedance in the recording phase. On the other hand, the rotary transformer 14 of the rotary head device 12 provides a relatively log DC resistance. Thus, the circuit arrangement after the coupling capacitor 19 in the recording phase is equivalent to a series circuit to the coupling capacitor 19, tho first feedback resistor 36, the fourth switch 39 and the feedback capacitor 38 coupled between the power source 15 and the ground potential source 17. Accordingly, the base potential $Vb21b$ of the transistor 21 in the recording phase is given as follows;

$$Vb21b = Vref + [C38/(C19+C38)] \cdot [I \cdot R36/2 \cdot (\beta+1)] \ldots \quad (6)$$

wherein C19 and C38 are the capacitances of the coupling capacitor 19 and 38, and R36 is the resistance of the first feedback resistor 36.

The time cons&ant $\tau b$ of the series circuit comprising the coupling capacitor 19, the first feedback resistor 36, the fourth switch 39 and the feedback capacitor 38 is given as follows;

$$\tau b = [C19 \cdot C38/(C19+C38)] \cdot (R36+R37) \ldots \quad (7)$$

wherein R37 is the resistance of the second feedback resistor 37.

Next, the operation of the circuit at the change from the recording phase to the reproducing phase will be described. In the steady state of the recording phase, both Equations (3) and (6) are also established for the base potentials V22b and V21b of the transistor 22 and the transistor 21.

When the operation of the circuit changes from the recording phase to the reproducing phase, the differential amplifier 20, the transistor 21 and the feedback amplifier 35 are activated Thus, the base potentials V22b and V21b in the recording phase vary with respect to the base potentials V22a and V21a in the reproducing phase as given by Equations (1) and (5). The potential from Vb22b to Vb22a changes gradually, similar to the case of the operation change from the reproducing phase to the recording phase. This is because the charge or the discharge of the capacitor 30 occurs at the potential change. The time spent in the potential change from Vb22b to Vb22a depends on the time constant $\tau a$ of the reference voltage source 24, which is given by Equation (4).

The base potential Vb21b of the transistor 21 in the recording phase gradually changes to the base potential Vb21a in the reproducing phase with the tim constant the same as the time constant $\tau b$ given by Equation (7).

FIGS. 2 and 3 show the changes of the base potentials Vb22 and Vb21 of the transistor 22 and 21, respectively.

The amplifier circuit comprised of the first reproduced signal amplifier 18, the second reproduced signal amplifier 31 and the feedback circuit 34 fails to operate accurately in the period when the base potentials Vb22a and Vb21a are varying. For example, the outputs of the first reproduced signal amplifier 18 are clipped to the bias voltage Vcc on the power source 15 and the ground potential on the ground potential source 17. Thus, the amplifier circuit cannot provide a correct reproduced signal.

As is well known, the time constants, such as the $\tau a$ and $\tau b$, represent 63.2% of the entire time for a variation. This is because, the time constant is provided by 1 - $e^{-1}$. If it is assumed that the amplifier circuit starts its normal operation when the base potentials Vb22 and Vb21 have reached about 99% of their steady-state values, i.e., the base potentials Vb22a and the Vb21a in the reproducing phase, as described before, the disabled time of the amplifier circuit expands to about 4.6 $[=\log \eta(1-0.99)]$ times of the longer one of the time constants $\tau a$ and $\tau b$.

Now examples of the time constants $\tau a$ and $\tau b$ in conventional control circuit for the recording and reproducing will be described. For the examples, it is assumed that actual values of the resistors and capacitors are given as follows;

---
C19 = C30 = C38 = 0.1 μF
R36 = 30 kΩ
R28 = R29 = 10 kΩ
R37 = 300 Ω
---

Then, the time constants $\tau a$ and $\tau b$ are calculated as the values of about 0.5 msec. and 1.52 msec., respectively, from Equations (4) and (7). As is easily understood from above examples, it is very difficult to reduce the disabled time below the time 115 μsec, in the conventional control circuit for the recording and reproducing.

SUMMARY OF THE INVENTION

It is, therefore, an object of the present invention to provide a control circuit for a recording and reproducing apparatus which is able to carry out an after-recording operation completely.

Another object of the present invention is to provide a control circuit for a recording and reproducing apparatus which is able to change operations between a reproducing phase and a recording phase rapidly.

A further object of the present invention is to provide a control circuit for a recording and reproducing apparatus in which charges of capacitors are maintained without changes through operation changes between a reproducing phase and a recording phase.

In order to achieve the above object, a control circuit for a recording and reproducing apparatus according to one aspect of the present invention in which the control circuit for the recording and reproducing apparatus includes a single magnetic head for recording and reproducing signals corresponding to data on a recording medium, a recording circuit for supplying a recording signal to be recorded to the magnetic head, a reproducing circuit for amplifying a reproduced signal detected from the recording medium by the magnetic head; and a switch for selectively shifting the apparatus between a recording phase wherein the recording circuit is activated, and a reproducing phase wherein the reproducing circuit is activated, wherein the reproducing circuit includes capacitors for storing an electric charge during operation of the apparatus, and buffers for maintaining the charge stored by the capacitors at a substantially constant level when the switch shifts between the recording phase and the reproducing phase.

Additional objects and advantages of the present invention will be apparent to persons skilled in the art from a study of the following description and the accompanying drawings, which are hereby incorporated in and constitute a part of this specification.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein.

DESCRIPTION OF THE PREFERRED EMBODIMENTS

Figure 1:
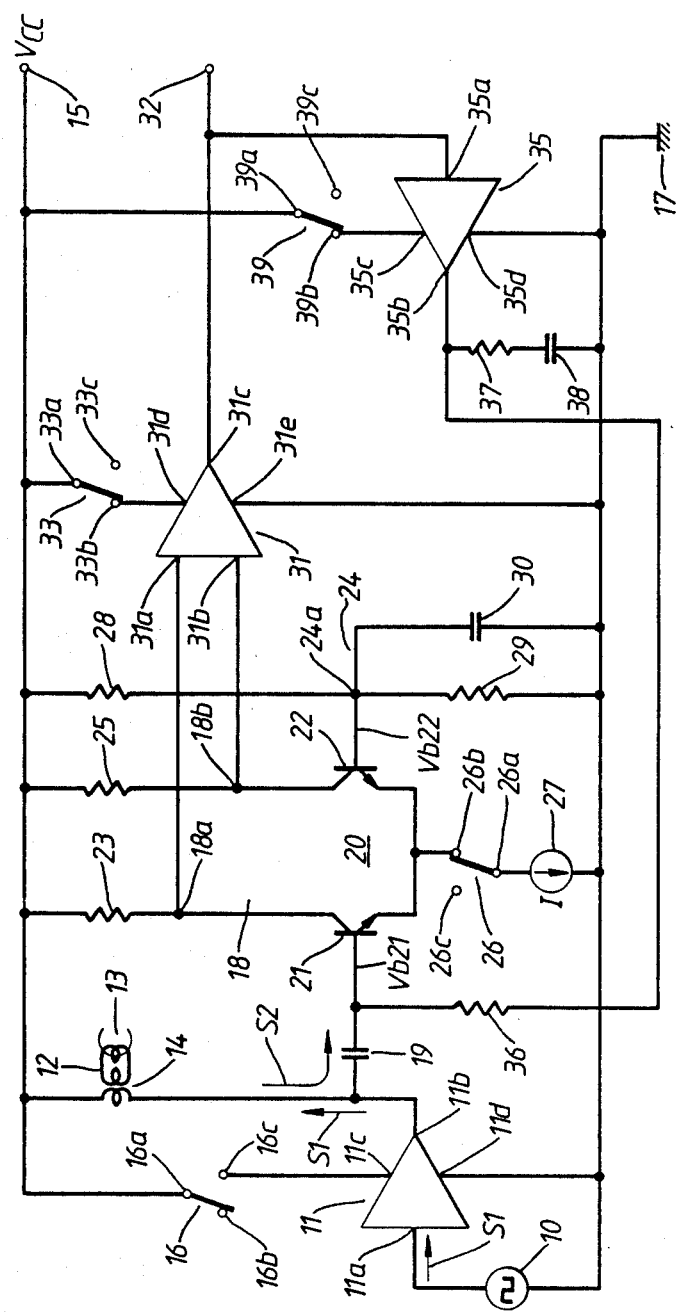
FIG. 1 is a circuit diagram showing an example of a conventional control circuit for a recording and reproducing apparatus.
Figure 2:
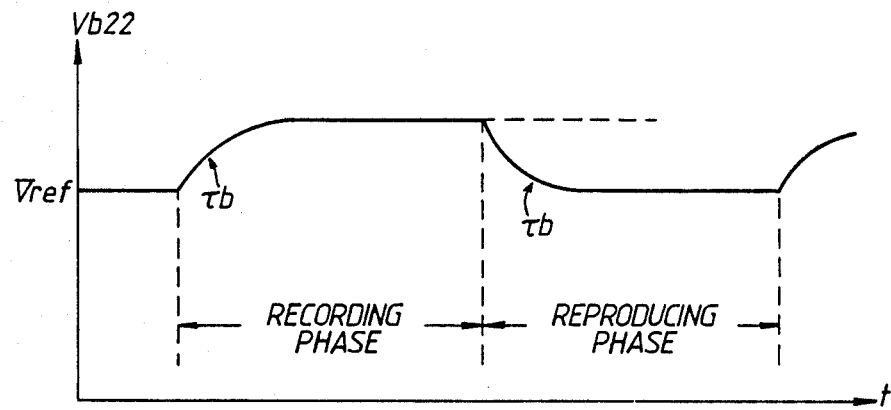
FIG. 2 and 3 are graphs showing the base potentials Vb22 and Vb21 of the differential amplifier 20 in FIG. 1.
Figure 3:
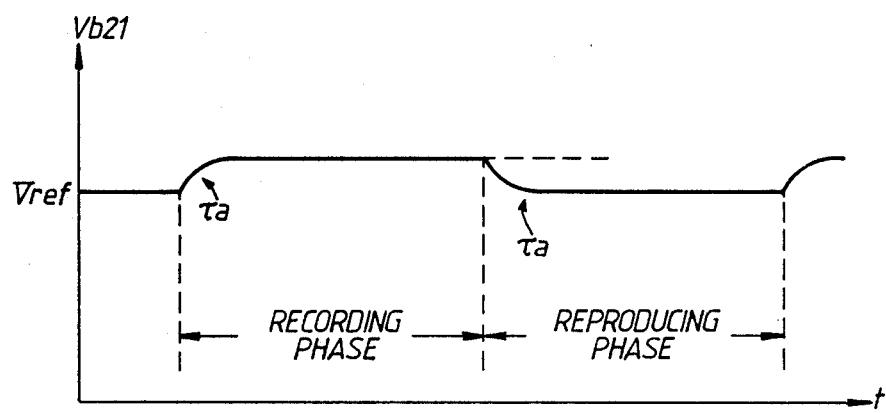

The present invention will be described in detail with reference to the FIGS. 4 and 5. Throughout drawings, reference numerals or letters used in FIG. 1 will be used to designate like or equivalent elements for simplicity of explanation.

Figure 4:
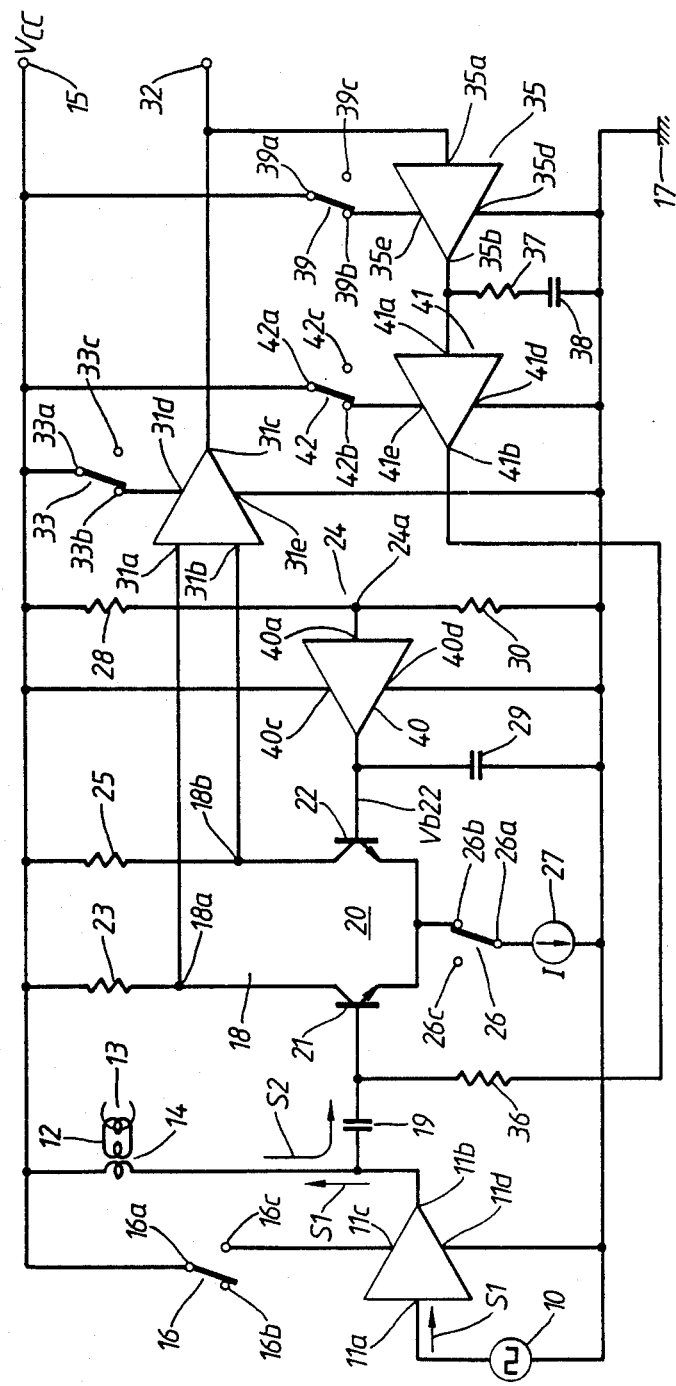
FIG. 4 is a circuit diagram showing an embodiment of the control circuit for the recording and reproducing apparatus according to the present invention.

Referring now to FIG. 4, an embodiment of the control circuit for the recording and reproducing apparatus according to the present invention will be described in detail.

In FIG. 4, numeral 10 designates a supply source of a recording signal S1. A recording signal amplifier 11 is provided with an input terminal 11a for receiving the recording signal S1. An output terminal 11b of the recording signal amplifier 11 is coupled to a rotary head device 12. The rotary head device 12 comprises a magnetic head 13 and a rotary transformer 14 coupled between the recording signal amplifier 11 and the magnetic head 13. A bias terminal 11c of the recording signal amplifier 11 is coupled to a power source 15 with a voltage Vcc through a first switch 16. Further, a ground terminal 11d of the recording signal amplifier 11 is coupled to a ground potential source 17.

The first switch 16 comprises a common terminal 16a coupled to the power source 15, a firs& switch terminal 16b left uncoupled and a second switch terminal 16c coupled to the bias terminal 11c of the recording signal amplifier 11. The common terminal 16a is selectively connected to the first switch terminal 16b or the second switch terminal 16c in response to the reproducing phase or the recording phase. Thus, the bias voltage Vcc is applied to the bias terminal 11c in the recording phase, so that the recording signal amplifier 11 is activated. On the other hand, the bias voltage Vcc is not applied to the bias terminal 11c in the reproducing phase, so that the recording signal amplifier 11 is deactivated. Here, it is assumed that the output terminal 11b takes a high impedance state in the reproducing phase.

The rotary head device 12 is coupled not only to the output terminal 11b of the recording signal amplifier 11, but also to a first reproduced signal amplifier 18 through a coupling capacitor 19. The first reproduced signal amplifier 18 is constituted bY a differential amplifier 20 comprising a pair of transistors 21 and 22 In the differential amplifier 20, the base of the transistor 21 is coupled to the rotary head device 12 through the coupling capacitor 19. The collector of the transistor 21 is coupled to the power source 15 through a load resistor 23 of the first reproduced signal amplifier 18. The emitters of the transistors 21 and 22 are coupled to each other. The base of the transistor 22 is coupled to a reference voltage source 24 through a first buffer amplifier 40, as described later. The collector of the transistor 22 is couple to the power source 15 through another 25 of the first reproduced signal amplifier 18. The emitters of the transistors 21 and 22 are coupled to the ground potential source 17 through a series circuit of a second switch 26 and a current source 27 of the first reproduced signal amplifier 18. The current source 27 provides a bias current I.

The second switch 26 comprises a common terminal 26a coupled to the current source 27, a first switch terminal 26b coupled to the emitters of the transistors 21 and 22 and a second switch terminal 26c left uncoupled. The common terminal 26a is selectively connected to the first switch terminal 26b or the second switch terminal 26c in response to the reproducing phase or the recording phase. Thus, the bias current I is supplied to the emitters of the transistors 21 and 22 in the reproducing phase, so that the differential amplifier 20 is activated. On the other hand, the bias current I is not supplied to the emitters of the transistors 21 and 22 in &he recording phase, so that the differential amplifier 20 is deactivated.

The reference voltage source 24 comprises a pair of resistors 28 arid 29. The resistors 28 and 29 are coupled in series between the power source 15 and the ground potential source 17. A coupling node between the resistors 28 and 29 constitutes a coupling node 24a of the reference voltage source 24 and is coupled to the bas of the transistor 22 of the differential amplifier 20 through the first buffer amplifier 40. An input terminal 40a of the first buffer amplifier 40 is coupled to the coupling node 24a of the reference voltage source 24. An output terminal 40b of the first buffer amplifier 40 is coupled to the base of the transistor 22 of the differential amplifier 20. A bias terminal 40c of the first buffer amplifier 40 is coupled to the power source 15. A ground terminal 40d of the first buffer amplifier 40 is coupled to the ground potential source 17. A capacitor 30 is coupled between the base of the transistor 22 and the ground potential source 17, so that an AC impedance on the base of the transistor 22 is decreased.

The collectors of the transistors 21 and 22 are coupled to first and second output terminal 18a and 18b of the first reproduced signal amplifier 18, respectively. the first and second output terminals 18a and 18b are coupled to a second reproduced signal amplifier 31. The second reproduced signal amplifier 31 is provided with input terminals 31a and 31b coupled to the first and second output terminals 18a and 18b of the first reproduced signal amplifier 18, respectively, for receiving the differential outputs of the first reproduced signal amplifier 18. An output terminal 31c of the second reproduced signal amplifier 31 is coupled to an output terminal 32 of the control circuit for the recording and reproducing apparatus. The output terminal 32 provides a reproduced signal obtained by the control circuit for the recording and reproducing apparatus to a suitable circuit for processing the reproduced signal. A bias terminal 31d of the second reproduced signal amplifier 31 is coupled to the power source 15 through a 33. Further, a ground terminal 31e of the second reproduced signal amplifier 31 is coupled to the ground potential source 17.

The third switch 33 comprises a common terminal 33a coupled to the power source 15, a first switch terminal 33b coupled to the bias terminal 31d of the second reproduced signal amplifier 31 and a second switch terminal 33c left uncoupled. The common terminal 33a is selectively connected to the first switch terminal 33b or the second switch terminal 33c in response to the reproducing phase or the recording phase. Thus, the bias voltage Vcc is applied to the bias terminal 31d in the reproducing phase, so that the second reproduced signal amplifier 31 is activated. On the other hand, the bias voltage Vcc is not applied to the bias terminal 31d in the recording phase, so that the second reproduced signal amplifier 31 is deactivated. Here, it is assumed that the output terminal 31c takes a high impedance state in the recording phase.

Further the output terminal 31c of the second reproduced signal amplifier 31 is coupled to the first reproduced signal amplifier 18 through a feedback circuit 34 for dumping an undesired resonant peak of the reproduced signal obtained on the output terminal 32 of the control circuit for the recording and reproducing apparatus. The feedback circuit 34 comprises a feedback amplifier 35, a second buffer amplifier 41, a pair of first and second feedback resistors 36, 37 and a feedback capacitor 38.

The feedback amplifier 35 is provided with an input terminal 35a coupled to the output terminal 31c of the second reproduced signal amplifier 31 for receiving the output of the second reproduced signal amplifier 31. An output terminal 35b of the feedback amplifier 35 is coupled to the first reproduced signal amplifier 18 through the second buffer amplifier 41 and the first feedback resistor 36, as described later. A bias terminal 36c of the feedback amplifier 35 is coupled tO the power source 15 through a fourth switch 39. Further, a ground terminal 35d of the feedback amplifier 35 is coupled to the ground potential source 17.

The fourth switch 39 comprises a common terminal 39a coupled to the power source 15, a first switch terminal 39b coupled to the bias terminal 35c of the feedback amplifier 35 and a second switch terminal 39c left uncoupled. The common terminal 39a is selectively connected to the first switch terminal 39b or the second switch terminal 39c in response to the reproducing phase or the recording phase. Thus, the bias voltage Vcc is applied to the bias terminal 35c in the reproducing phase, so that the feedback amplifier 35 is activated. On the other hand, the bias voltage Vcc is not applied to the bias terminal 35c in the recording phase. so that the feedback amplifier 35 is deactivated. Here, it is assumed that the ground terminal 35b takes a high impedance state in the recording phase.

An input terminal 41a of the second buffer amplifier 41 is coupled to the ground terminal 35b of the feedback amplifier 35 for receiving the output of the feedback amplifier 35. An output terminal 41b of the second buffer amplifier 41 is coupled to the first reproduced signal amplifier 18 through the first feedback resistor 36. In more detail, the output terminal 41b is coupled to the base of the transistor 21 of the differential amplifier 20 through the first feedback resistor 36. A bias terminal 41c of the second buffer amplifier 41 is coupled to the power source 15 through a fifth switch 42. Further, a ground terminal 41d of the second buffer amplifier 41 is coupled to the ground potential source 17.

The fifth switch 42 comprises a common terminal 42a coupled to the power source 15, a first switch terminal 42b coupled to the bias terminal 41c of the second buffer amplifier 41 and a second switch terminal 42c left uncoupled. The common terminal 42a is selectively connected to the first switch terminal 42b or the second switch terminal 42c in response to the reproducing phase or the recording phase. Thus, the bias voltage Vcc is applied to the bias terminal 41c in the reproducing phase, so that the second buffer amplifier 41 is activated. On the other hand, the bias voltage Vcc is not applied to the bias terminal 41c in the recording phase, so that the second buffer amplifier 41 is deactivated. Here, it is assumed that the output terminal 41b takes a high impedance state in the recording phase.

The first feedback resistor 36 is coupled between the ground terminal 35b of the feedback amplifier 35 and the base of the transistor 21 of the differential amplifier 20 through the second buffer amplifier 41, as described before. The second feedback resistor 37 and the feedback capacitor 38 are coupled in series between the ground terminal 35b of the feedback amplifier 35 and the ground potential source 17. As a result, the first reproduced signal amplifier 18, the second reproduced signal amplifier 31 and the feedback circuit 34 constitute an amplifier circuit fOr the reproduced signal S2.

Now the operation of the embodiment of the control circuit for the recording and reproducing apparatus according to the present invention will be described.

The first, second, third, fourth and fifth switches 16, 26, 33, 39 and 42 are simultaneously operated in response to the reproducing phase or the recording phase. In the after-recording operation mode, the reproducing phase and the recording phase changes therebetween at a rapid speed, as described before.

In the reproducing phase corresponding to the main data block area of every record track, the common terminals 16a, 26a, 33a, 39a and 42a of the first, second, third, fourth and fifth switches 16, 26, 33, 39 and 42 are connected to the first switch terminals 16b, 26b, 33b, 39b and 42b, respectively. Thus, the first reproduced signal amplifier 18, the second reproduced signal amplifier 31, the feedback amplifier 35 and the second buffer amplifier 41 are activated. On the other hand, the recording signal amplifier 11 is deactivated, so that the recording signal amplifier 11 interferes the transmission of the recording signal S1 supplied from the recording signal source 10 to the rotary head device 12. Main data recorded on the main data block are reproduced bY the magnetic head 13 of the rotary head device 12. The reproduced signal S2 is applied to the first reproduced signal amplifier 18 through the coupling capacitor 19. Then, the reproduced signal S2 is amplified by the differential amplifier 20 and the second reproduced signal amplifier 3!. Undesired resonant peak of the amplified data obtained from the output terminal 31c of the second reproduced signal amplifier 31 is suppressed by the feedback circuit 34. Thus, the reproduced signal S2 is obtained on the output terminal 32.

The feedback amplifier 35 in the feedback circuit 34 converts the voltage of the amplified data on the output terminal 31c of the second reproduced signal amplifier 31 to the corresponding current. The current output from the ground terminal 35b of the feedback amplifier 35 is again changed to a voltage data by the series circuit of the second feedback resistor 37 and the feedback capacitor 38. The voltage data are applied to the first reproduced signal amplifier 18, i.e., the base of the transistor 21 of the differential amplifier 20 through the second buffer amplifier 41 and the first feedback resistor 36 as fedback data. That is, the fedback data have the opposite phase against the reproduced signal S2 from the rotary head device 12 to the first reproduced signal amplifier 18. The reproduced signal S2 from the rotary head device 12 is influenced by the inductance of the rotary transformer 14 and the input capacitance of the transistor 21. Thus, the output data of the first reproduced signal amplifier 18 include the undesired resonant peak, as described before, due to the resonance between the inductance of the rotary transformer 14 and the input capacitance of the transistor 21. The undesired resonant peak of the output data is suppressed by the feedback circuit 34. Further, the entire vaulue of the direct-current (abbreviated as DC hereafter) component of the output data on the output terminal 31c of the second reproduced signal amplifier 31 is negatively fedback through the feedback circuit 34 to the first reproduced signal amplifier 18. Thus, the output data on the output terminal 32 are stabilized. The second buffer amplifier 41 operates to isolate the DC coupling between the base of the transistor 21 and the feedback capacitor 38, as described later.

In the recording phase corresponding to the sub-code area of every record track, the common terminals 16a, 26a, 33a, 39a and 42a of the first, second, third, fourth and fifth switches 16, 26, 33, S9 and 42 are connected to the second switch terminals 16c, 26c, 33c, 39c and 42c, respectively. Thus, the first reproduced signal amplifier 18, the second reproduced signal amplifier 31, the feedback amplifier 35 and the fifth switch 42 are deactivated. On the other hand, the recording signal amplifier 11 is activated, so that the recording signal amplifier 11 amplifies the recording signal S1 supplied from the recording signal source 10 and admits the transmission of the recording signal S1 to the rotary head device 12. Thus, the recording signal S1 are recorded on the specified block in the sub-code area of every record track for the after-recording.

In the after-recording operation, the operation of the circuit has to change between the reproducing phase and the recording phase at a very high speed. That is, the EIAJ standard for the digital audio tape recorders provides a buffer space corresponding to the time of about 115 μsec., as described before. Accordingly, the operation of the circuit must change between the reproducing phase and the recording phase within 115 μsec.

If the capacitors 19, 30 and 38 in the control circuit for the recording and reproducing apparatus are charged or discharged at every change between the reproducing phase and the recording phase, the chargings or the dischargings at the capacitors 19, 30 and 38 take a relatively long time more than 115 μsec. provided for the buffer space between the reproducing phase and the recording phase. So that, the control circuit for the recording and reproducing apparatus can not carry out the after-recording operation sufficiently.

In the embodiment, however, there are provided the first buffer amplifier 40 and the second buffer amplifier 41, as shown in FIG. 4. The first buffer amplifier 40 and the second buffer amplifier 41 operate to interfere a DC coupling between circuits coupled to their input terminals and output terminals. That is, the first buffer amplifier 40 interferes the DC coupling between the capacitor 30 and a DC reference potential circuit, such as the power source 15 and the ground potential source 17, through the reference voltage source 24. Also the second buffer amplifier 41 interferes the DC couplings between the coupling capacitor 19 and the feedback capacitor 38 and the DC reference potential circuit, i.e., the ground potential source 17.

Now the operations of the embodiment of the control circuit for the recording and reproducing apparatus according to the present invention will be described in detail.

First, the operation of the circuit at the change from the reproducing phase to the recording phase will be described. The base potential Vb22a of the transistor 22 in the reproducing phase is given as follows;

$$Vb22a = [R29/(R28 + R29)] \cdot Vcc \qquad (8)$$
$$= Vref$$

Equation (8) differs from Equation (1) in that the former does not include the second term in the latter. This is because the base of the transistor 22 is isolated from the reference voltage source 24 in the DC coupling, so that the base current of the transistor 22 is prevented, the first reproduced signal amplifier 18, i.e, the differential amplifier 20 is deactivated in the recording phase. On the other hand, the first buffer amplifier 40 is activated both in the reproducing phase and the recording phase. As a result, the base potential Vb22 of the transistor 22 is usually maintained at the potential Vref applied from the coupling node 24a of the reference voltage source 24. In other word, the base potential Vb22 of the transistor 22 is maintained in the constant potential Vref through both the reproducing phase and the recording phase.

Now the base potential Vb21 of the transistor 21 will be described. In the reproducing phase, the operations of the transistors 21 and 22 balance with each other, as described before. Thus, the base potential Vb21a of the transistor 21 in the reproducing phase is the same the base potential Vb22a of the transistor 22. The base potential Vb21a of the transistOr 21 is given as follows;

$$Vb21a = [R29/(R28 + R29)] \cdot Vcc \qquad (9)$$
$$= Vref$$

When the operatiOn phase of the circuit changes from the reproducing phase to the recording phase, the differential amplifier 20 and the second buffer amplifier 41 are deactivated. The base of the transistor 21 and the output terminal 41b of the second buffer amplifier 41 become to the very high impedance state. Accordingly, the transistor 21 and the second buffer amplifier 41 are assumed as being separated from the the coupling capacitor 19. As a result, the end of the coupling capacitor 19 coupled to the base of the transistor 21 is set free from circuit connection. The charge on the coupling capacitor 19 is then held unchanged from the charge at the reproducing phase.

Now a charge voltage V38 on the feedback capacitor 3B will be described. In the reproducing phase, the charge voltage V38a on the feedback capacitor 38 is given as follows:

$$V38a = [R29/(R28 + R29)] \cdot Vcc + [I \cdot R36/2 \cdot (\beta + 1)] \qquad (10)$$
$$= Vref + [I \cdot R36/2 \cdot (\beta + 1)]$$

When the operation phase of the circuit changes from the reproducing phase to the recording phase, the feedback amplifier 35 and the second buffer amplifier 41 are deactivated. Both the ground terminal 35b of the feedback amplifier 35 and the output terminal 41b of the second buffer amplifier 41 become to the very high impedance state. Accordingly, the feedback amplifier 35 and the second buffer amplifier 41 are assumed as being separated from the feedback capacitor 38. As a result, the end of the feedback capacitor 38 coupled to the second feedback resistor 37 is set free from circuit connection. The charge on the feedback capacitor 38 is then held unchanged from the charge at the reproducing phase.

As described above, the charges on all of the capacitors 19, 30 and 38 are maintained at the constant values through both the reproducing phase to the recording phase. The base potentials Vb21 and Vb22 of the transistors 21 and 22 of the differential amplifier 20 are also maintained at the constant value Vref through both the reproducing phase to the recording phase. As a result, the operation change of the circuit of the embodiment from the reproducing phase to the recording phase is carried out rapidly.

In the recording phase, a potential on the output terminal 11b of the recording signal amplifier 11 varies around the bias voltage Vcc at a large amplitude. The base potential Vb21 of the transistor 21 also varies in proportion to the potential. When the operation of the circuit changes from the recording phase to the reproducing phase, the potential on the output terminal 11b is settled to the bias voltage Vcc. The base potential Vb21 is also settled to the constant value Vref at the same time, as described before. Thus, the operation change of the circuit from the recording phase to the reproducing phase is also carried out rapidly.

Figure 5:
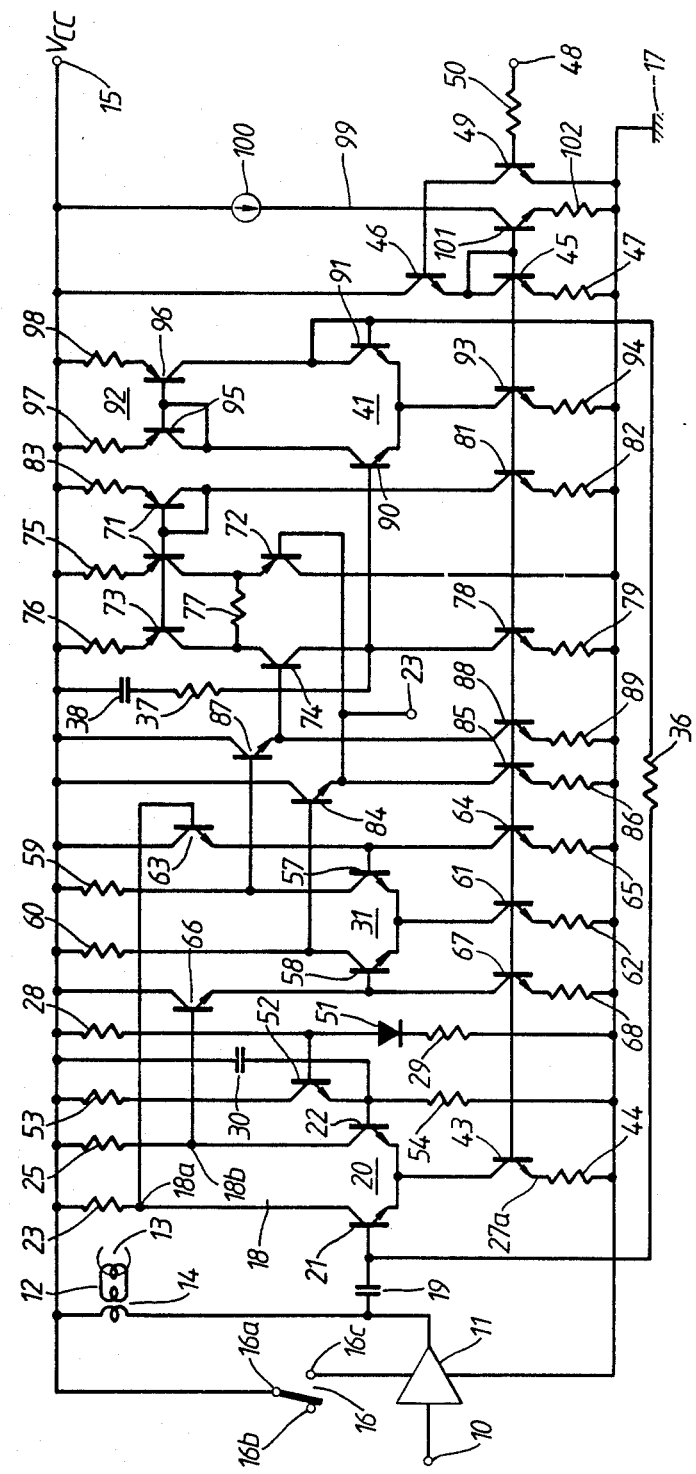
FIG. 5 is a circuit diagram showing the practical circuit of FIG. 4 in an integrated circuit configuration

Referring now to FIG. 5, a modification of the embodiment of the control circuit for the recording and reproducing apparatus for recording apparatus according to the present invention will be described. The circuit of FIG. 5 is suitable for manufacturing on integrated circuits.

In FIG. 5, numeral 10 designates a supply source of a recording signal S1. A recording signal amplifier 11 is provided with an 11a for receiving the recording signal S1. An output terminal 11b of the recording signal amplifier 11 is coupled to a rotary head device 12. The rotary head device 12 comprises a magnetic head 13 and a rotary transformer 14 coupled between the recording signal amplifier 11 and the magnetic head 13. A bias terminal 11c of the recording signal amplifier 11 is coupled to a power source 15 with a voltage Vcc through a first switch 16. Further, a ground terminal 11d of the recording signal amplifier 11 is coupled to a ground potential source 17.

The first switch 16 comprises a common terminal 16a coupled to the power source 15, a first switch terminal 16b left uncoupled and a second switch terminal 16c coupled to the bias terminal 11c of the recording signal amplifier 11. The common terminal 16a is selectively connected to the first switch terminal 16b or the second switch terminal 16c in response to the reproducing phase or the recording phase. Thus, the bias voltage Vcc is applied to the bias terminal 11c in the recording phase, so that the recording signal amplifier 11 is activated. On the other hand, the bias voltage Vcc is not applied to the bias terminal 11c in the reproducing phase so that the recording signal amplifier 11 is deactivated. Here, it is assumed that the output terminal 11b takes a high impedance state in the reproducing phase.

The rotary head device 12 is coupled not only to the output terminal 11b of the recording signal amplifier 11, but also to a first reproduced signal amplifier 18 through a coupling capacitor 19. The first reproduced signal amplifier 18 is constituted by a differential amplifier 20 comprising a pair of transistors 21 and 22. In the differential amplifier 20, the base of the transistor 21 is coupled to the rotary head d vice 12 through the coupling capacitor 19. The collector of the transistor 21 is couple to the power source 15 through a load resistor 23 of the first reproduced signal amplifier 18. The emitters of the transistors 21 and 22 are coupled to each other. The base of the transistor 22 is coupled to a reference voltage source 24 through a first buffer amplifier 40, as described later. The collector of the transistor 22 is couple to the power source 15 through another load resistor 25 of the first reproduced signal amplifier 18. The emitters of the transistors 21 and 22 are coupled to the grOund potential source 17 through a series circuit of a first constant current source 27a.

The first constant current source 27a comprises a transistor 43 and a resistor 44. The base of the transistor 43 is coupled to the base of a transistor 45. The collector of the transistor 45 is coupled not only to their base, but also to the power source 15 through a transistor 46. The emitter of the transistor 45 is coupled to the ground potential source 17 through a resistor 47. Thus, the transistor 43 and the transistor 45 are coupled together, so that they forms a current mirror circuit.

The base of the transistor 46 is coupled to a control terminal 48 through a transistor 49 and a resistor 50. A control signal for selecting the operation of the control circuit for the recording and reproducing apparatus between the reproducing phase and the recording phase is applied to the control terminal 48. Thus, the transistor 46, the control terminal 48, the transistor 49 and the resistor 50 form a switch equivalent to the second switch 26 of FIG. 4 or the like.

The reference voltage source 24 comprises a pair of resistors 28, 29 and a diode 51. The resistor 28, the diode 51 and the resistor 29 are coupled in series between the power source 15 and the ground potential source 17. A coupling node between the resistor 28 and the diode 51 constitutes a coupling node 24a of the reference voltage source 24 and is coupled to the base of the transistor 22 of the differential amplifier 20 through the first buffer amplifier 40.

The first buffer amplifier 40 comprises a transistor 52, a pair of resistors 53 and 54. The base of the transistor 52 is coupled to the coupling node 24a of the reference voltage source 24. The collector of the transistor 52 is coupled to the power source 15 through the resistor 53. The emitter of the transistor 52 is coupled not only to the base of the transistor 22 but also to the ground potential source 17 through the resistor 54. A capacitor 30 is coupled between the base of the transistor 22 and the power source 15, so that an AC impedance on the base of the transistor 22 is decreased.

The collectors of the transistors 21 and 22 are coupled to first and second output terminals 18a and 18b of the first reproduced signal amplifier 18, respectively. The first and second output terminals 18a and 18b are coupled to a second reproduced signal amplifier 31 through coupling circuits 55 and 56. The second reproduced signal amplifier 31 is constituted by a differential amplifier which is similar to the differential amplifier 20. That is, the differential amplifier of the second reproduced signal amplifier 31 comprises a pair of transistors 57 and 58 and a pair of load resistors 59 and 60. The emitters of the transistors 57 and 58 are coupled to the ground potential source 17 through a series circuit of a transistor 61 and a resistor 62. The base of the transistor 61 is coupled to the base of the transistor 45 similar to the transistor 43 of the first constant current source 27a. Thus, the transistor 46, the control terminal 48, the transistor 49 and the resistor 50 serve as a switch equivalent to the third switch 33 of FIG. 4 or the like.

The coupling circuit 55 comprises a pair of transistors 63 and 64 and a resistor 65. The transistors 63, 64 and the resistor 65 are coupled in series between the power source 15 and the ground potential source !7. The base of the transistor 63 is coupled to the first reproduced signal amplifier 18a of the first reproduced signal amplifier 18. the coupling node of the transistors 63 and 64 is coupled to the base of the transistor 57 of the second reproduced signal amplifier 31. The coupling circuit 56 comprises a pair of transistors 66 nd 67 and a resistor 68. The transistors 66, 67 and the resistor 68 are coupled in series between the power source !5 and the ground potential source 17. The base of the transistor 66 is coupled to the second output terminal 18b of the first reproduced signal amplifier 18. The coupling node of the transistors 66 and 67 is coupled to the base of the transistor 58 of the second reproduced signal amplifier 31. The bases of the transistors 64 and 67 are coupled to the base of the transistor 45 similar to the transistor 43 of the first constant current source 27a. Thus, the transistor 46, the control terminal 48, the transistor 49 and the resistor 50 serve as a switch equivalent to the third switch 33 of FIG. 4 or the like.

The second reproduced signal amplifier 31 is coupled to the first reproduced signal amplifier 18 through a feedback circuit 34 for dumping an undesired resonant peak of the reproduced signal obtain d on the output terminal 32 of the control circuit for the recording and reproducing apparatus. The feedback circuit 34 comprises a feedback amplifier 35, a second buffer amplifier 41, a pair of feedback resistors 36, 37 and a feedback capacitor 38.

The second reproduced signal amplifier 3I is coupled to the feedback amplifier 35 through a pair of coupling circuits 69 and 70. The feedback amplifier 35 comprises four transistors 71, 72, 73 and 74 and three resistors 75, 76 and 77. A series circuit of the resistor 75 and the transistors 71 and 72 are coupled between the power source 15 and the ground potential source 17 A series circuit of the resistor 76 and the transistors 74 and 74 are coupled between the power source 15 and the ground potential source 17 through a series circuit of a transistor 78 and a resistor 79. Both coupling nodes of the transistors 71 and 72 and the transistors 74 and 74 are coupled together through the resistor 77. Both the bases of the transistors 71 and 73 are coupled to the base of a transistor 80. The collector of the transistor 80 is coupled not only to their base, but also to the ground potential source 17 through a a series circuit of a transistor 81 and a resistor 82. The emitter of the transistor 80 is coupled to the power source 15 through a resistor 83. Thus, the eitehr of the transistors 71 and 73 and the transistor 80 are coupled together, so that they forms current mirror circuits. The base of the transistor 81 is coupled to the base of the transistor 45 similar to the transistor 43 of the first constant current source 27a. Thus, the transistor 46, the control terminal 48, the transistor 49 and the resistor 50 serve as a switch equivalent to the fourth switch 39 of FIG. 4 or the like. The base of the transistor 78 is also coupled to the base of the transistor 45 similar to the transistor 43 of the first constant current source 27a. Thus, the transistor 46, the control terminal 48, the transistor 49 and the resistor 50 serve as a switch equivalent to the fourth switch 39 of FIG. 4 or the like.

The coupling circuit 69 comprises a pair of transistors 84 and 85 and a resistor 86. The transistors 84, 85 and the resistor 86 are coupled in series between the power source 15 and the ground potential source 17. The base of the transistor 84 is coupled to the collector of the transistor 58 of the second reproduced signal amplifier 31. The coupling node of the transistors 84 and 85 is coupled to the base of the transistor 72 of the feedback amplifier 35. THe coupling circuit 70 comprises a pair of transistors 87 and 88 and a resistor 89. The transistors 87, 88 and the resistor 89 are coupled in series between the power source 15 and the ground potential source 17. The base of the transistor 87 is coupled to the collector of the transistor 57 of the second reproduced signal amplifier 31. The coupling node of the transistors 87 and 88 is coupled to the base of the transistor 74 of the feedback amplifier 35. The bases of the transistors 85 and 88 are coupled to the base of the transistor 45 similar to the transistor 43 of the first constant current source 27a. Thus, the transistor 46, the control terminal 48, the transistor 49 and the resistor 50 serve as a switch equivalent to the fourth switch 39 of FIG. 4 or the like.

The coupling node of the transistors 84 and 85 is coupled to the output terminal 32. THe collector of the transistor 74 is coupled to the series circuit of the second feedback resistor 37 and the feedback capacitor 38, but also to the second buffer amplifier 41.

The second buffer amplifier 41 is constituted by a differential amplifier which is similar to the differential amplifier 20. That is the differential amplifier of the second buffer amplifier 41 comprises a pair of transistors 90 and 91 and an active load circuit 92. The emitters of the transistor and 91 are coupled to the ground potential source 17 through a series circuit of a transistor 93 and a resistor 94. The base of the transistor 93 is coupled to the base of the transistor 45 similar to the transistor 43 of the first constant current source 27a. Thus, the transistor 46, the control terminal 48, the transistor 49 and the resistor 50 serve as a switch equivalent to the fifth switch 42 of FIG. 4 or the like.

The active load circuit 92 comprises a pair of transistors 95 and 96 and a pair of resistors 97 and 98. The series circuit of the resistor 97 and the transistor 95 is coupled between the power source 15 and the transistor 90. The series circuit of the resistor 98 and the transistor 96 is coupled between the power source 15 and the transistor 91. The base of the transistor 96 is coupled not only the base of the transistor 95, but also to the collector of the transistor 95, so that the transistors 95 and 96 are coupled in the current mirror configuration.

The base and the collector of the transistor 91 are coupled together and then coupled to the base of the transistor 21 of the differential amplifier 20 through the first feedback resistor 36.

The base and the collector of the transistor 45 are coupled together and then coupled to a driver circuit 99 for the switches. The driver circuit 99 comprises a second constant current source 100, a transistor 101 and a resistor 102 which are coupled in series between the power source 15 and the ground potential source 17.

As described above, the present invention can provide an extremely preferable control circuit for the recording and reproducing apparatus.

While there has been illustrated and described what are at present considered to be preferred embodiments of the present invention, it will be understood by those skilled in the art that various changes and modifications may be made, and equivalents may be substituted for elements thereof without departing from the true scope of the present invention. In addition, many modifications may be made to adapt a particular situation or material to the teaching of the present invention without departing from the central scope thereof. Therefore, it in intended that the present invention not be limited to the particular embodiment disclosed as the best mode contemplated for carrying out the present invention, but that the present invention includes all embodiments falling within the scope of the appended claims.

What is claimed is:

1. A control circuit for a recording and reproducing apparatus comprising:
   a single magnetic head for recording and reproducing signals corresponding to data on a recording medium;
   recording circuit means for supplying a recording signal to be recorded to the magnetic head;

reproducing circuit means for amplifying a reproduced signal detected from the recording medium by the magnetic head; and switch means for selectively shifting the apparatus between a recording phase wherein the recording circuit means is activated, and a reproducing phase wherein the reproducing circuit means is activated;

wherein the reproducing circuit means includes capacitor means for storing an electric charge during operation of the apparatus, and buffer means coupled between the capacitor means and a DC bias source, for maintaining the charge stored by the capacitor means at a substantially constant level when the switch means shifts between the recording phase and the reproducing phase, said buffer means including an output coupled to the capacitor means, which presents a high impedance and a low impedance for the recording phase and the reproducing phase, respectively.

2. The circuit of claim 1 wherein the reproducing circuit means includes amplifier circuit means for amplifying the reproduced signal, and feedback circuit means for stabilizing the reproduced signal by decreasing an input impedance of the amplifier circuit means, the capacitor means including amplifier capacitor means and feedback capacitor means coupled to the amplifier circuit means and the feedback circuit means, and the buffer means including first and second buffer circuits connected to the amplifier capacitor and the feedback capacitor.

3. The circuit of claim 2 wherein the amplifier circuit means includes a differential amplifier having a pair of first and second transistors and a reference voltage source, the base of the first transistor being coupled to both the magnetic head and the buffer circuit means and the base of the second transistor being coupled to the reference voltage source.

4. The circuit of claim 3 wherein the amplifier capacitor means includes a coupling capacitor coupled between the magnetic head and the base of the input transistor and an impedance decreasing capacitor coupled between the base of the second transistor and a ground terminal, the first buffer circuit means being coupled between the impedance decreasing capacitor and the reference voltage source and the second buffer circuit means being coupled between the base of the first transistor and the feedback capacitor.

5. The circuit of claim 4 wherein the first buffer circuit means is activated in both the recording phase and the reproducing phase and the second buffer circuit means is selectively activated in the reproducing phase.

* * * * *